(12) United States Patent
Cnudde et al.

(10) Patent No.: US 7,684,336 B2
(45) Date of Patent: Mar. 23, 2010

(54) REAL-TIME VIDEO PACKET MONITORING AND PROCESSING FOR ENHANCED QUALITY OF SERVICE

(75) Inventors: Peter Cnudde, Sunnyvale, CA (US); Fan Du, Campbell, CA (US); Tao Lin, Foster City, CA (US)

(73) Assignee: SRI International, Menlo Park, CA (US)

( * ) Notice: Subject to any disclaimer, the term of this patent is extended or adjusted under 35 U.S.C. 154(b) by 57 days.

(21) Appl. No.: 11/759,819

(22) Filed: Jun. 7, 2007

(65) Prior Publication Data

US 2008/0107031 A1     May 8, 2008

Related U.S. Application Data

(60) Provisional application No. 60/865,118, filed on Nov. 9, 2006.

(51) Int. Cl.
*H04L 12/26*     (2006.01)

(52) U.S. Cl. .................................... 370/236; 230/401
(58) Field of Classification Search ................ 370/329, 370/394, 229, 401, 252, 389
See application file for complete search history.

(56) References Cited

U.S. PATENT DOCUMENTS

| | | | |
|---|---|---|---|
| 6,215,774 B1 * | 4/2001 | Knauerhase et al. | 370/252 |
| 7,016,318 B2 * | 3/2006 | Pankaj et al. | 370/329 |
| 2005/0226149 A1 * | 10/2005 | Jacobson et al. | 370/229 |
| 2007/0127508 A1 * | 6/2007 | Bahr et al. | 370/401 |
| 2007/0223470 A1 * | 9/2007 | Stahl | 370/389 |
| 2008/0019371 A1 * | 1/2008 | Anschutz et al. | 370/394 |

* cited by examiner

*Primary Examiner*—Albert T Chou
(74) *Attorney, Agent, or Firm*—Marger Johnson & McCollom, P.C.

(57) ABSTRACT

In one embodiment, a dynamic rate control scheme controls transmission rates and adaptively filters out video packets when a packet queue is full. This allows video streams to be more efficiently transmitted through low bandwidth and dynamically changing links.

17 Claims, 6 Drawing Sheets

REAL-TIME VIDEO PACKET MONITORING AND PROCESSING FOR ENHANCED QUALITY OF SERVICE

The present application claims priority from provisional application Ser. No 60/865,118 filed on Nov. 9, 2006 entitled: VIDEO PACKET PROCESSING FOR ENHANCED QUALITY OF SERVICE ON LOW BANDWIDTH LINKS which is incorporated by reference in its entirety.

BACKGROUND

Low transmission rates can force real time video packets to be either dropped or delayed. Variation in transmission rates also create delay jitter among video packets. These issues make it difficult to deliver real time video through upstream low bandwidth links.

One solution is to provide a lower rate video source. However, this degrades the video quality even when bandwidth increases on low bandwidth upstream links. For mixed high and low bandwidth links in the network, the higher bandwidth paths to the video source could then not fully utilize available bandwidth to view higher quality videos due to the other lower bandwidth paths.

Previous work related to processing packets in an Internet environment for Quality of Service (QoS) largely involved assigning priorities to different types of traffic flows and corresponding queue management techniques. However, these techniques do not address the problems related to low rate video links.

DESCRIPTION OF EXAMPLE EMBODIMENTS

Overview

A dynamic rate control scheme controls transmission rates and adaptively filters video packets when a packet queue is full. This allows video streams to be more efficiently transmitted through low bandwidth and dynamically changing links.

Description

Figure 1:
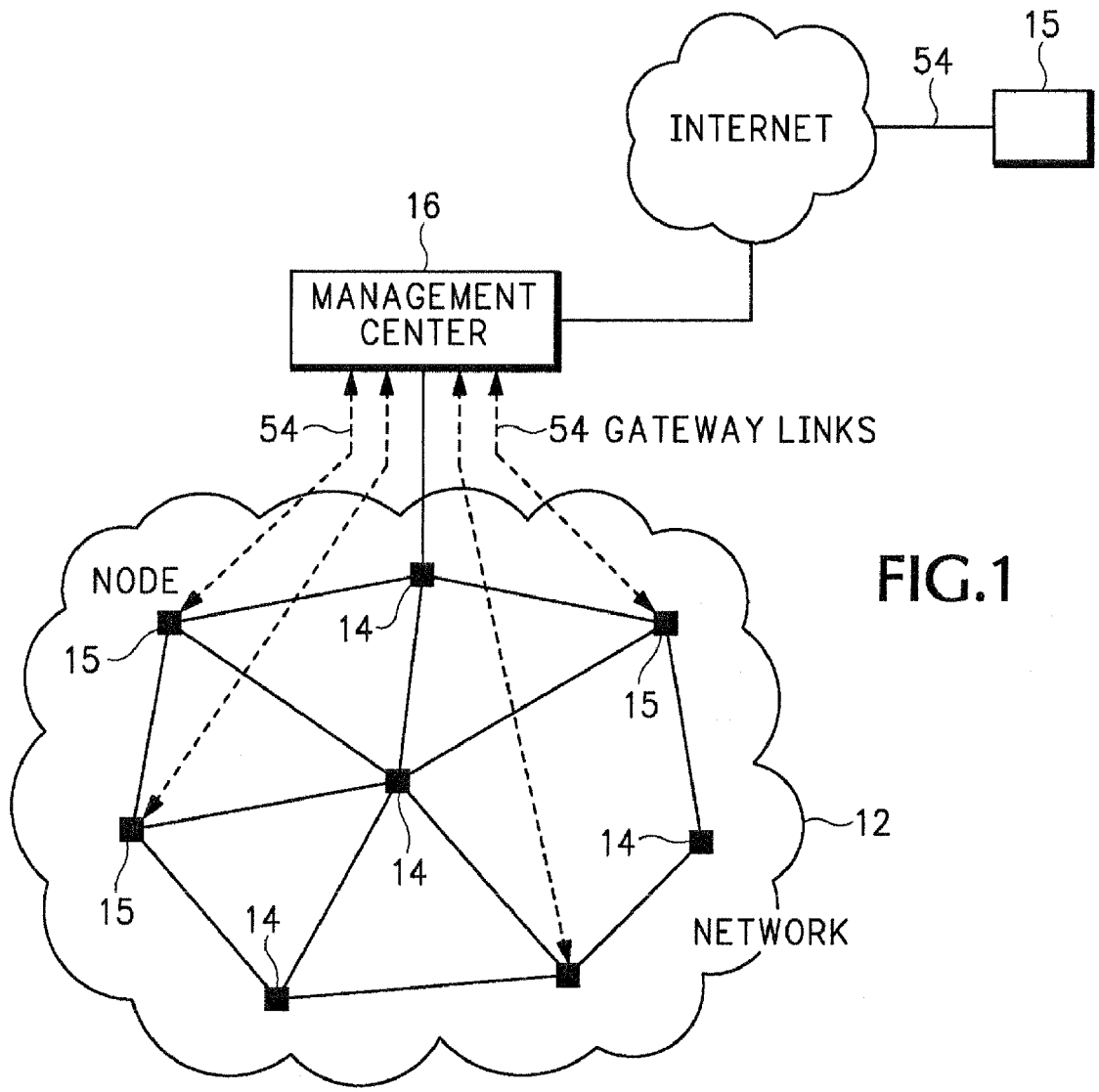
FIG. 1 is a diagram showing a network for transporting media, in which nodes may be meshed.

FIG. 1 shows digital video distribution in a network 12 where nodes 14 and 15 are interconnected through connections such as Ethernet, broadband wireless such as Wi-Fi, or a wireless mesh network.

The nodes that communicate to other nodes through the management center 16 are referred to as gateway nodes 15. Where the nodes 14 and 15 are connected in a mesh, a gateway node may be part of a mesh or can be outside a mesh. Any node 14 and 15 in the network 12 may be capable of acting as a gateway node 15 but it is not necessary that all nodes act as gateways. The gateway links 54 connecting the gateway nodes 15 to management center 16 may be wire links or wireless links. The gateway nodes 15 may run secure virtual connections through Virtual Private Networks (VPNs) over gateway links 54 but it is not required.

The nodes 14 and 15 can be any type of computing device that can generate, receive, or transfer video packets. For example, the nodes 14 and 15 can be laptop computers, Personal Computers (PCs), servers, routers, switches, Personal Digital Assistants (PDAs), smart phones, cellular PC cards, or any other type of wireless or wired device.

Typically, video is created and shared within the network 12 through the direct Ethernet or broadband connections. However, sometimes video needs to either be uploaded or downloaded through the management center 16 using the gateway nodes 15. This may include video generated within the network 12, externally generated video, or both.

Real time video typically requires 200 thousand bits per second (kbps) transmission rates for acceptable viewing quality. Gateway links 54 may go through cellular data links, such as Evolutionary Data Only (EvDO). These links often provide a much lower transmission rate than Ethernet or broadband Wireless Local Area Networks (WLANs) also popularly referred to as Wi-Fi. Upstream transmission rates (mobile-to-base station) are also usually lower than downstream transmission rates and can also vary from time to time.

A dynamic transmission rate scheme and selective filtering approach are used to solve these problems. A video receiver behind a low bandwidth link sees relatively good quality video if the quality of the uplink is good. When the quality of the uplink becomes poor, motion may be slower but clear video may still provided. In addition, a video receiver behind a low data rate link will not prevent other viewers from viewing high quality video from the same video source, unless the video receiver is the forwarding node for other video viewers. Video packets transmitted over these low bandwidth links are intelligently dropped.

Video packets are processed in an environment where the number of available communication channels can vary with time and the performance conditions of the channels can also vary with time. For example, some or all of the nodes 14 and 15 could also be part of a mesh network. Data packets that need potentially high bandwidth, such as packets that contain video, are dynamically processed to optimize quality of service performance over relatively low bandwidth channels.

Video processing involves packets in the context of an Internet Protocol (IP) paradigm. Adding a low resolution version of video on a permanent basis is not necessarily a preferred choice since it creates a separate class of application. Moreover, low and high resolution options require end users to choose different resolutions and usually are not feasible since most end users are not network experts. It is also very difficult for users to determine network status at any given time since the network and network components may be mobile. Thus, the dynamic approach described below automatically optimizes Quality of Service (QoS) without adjusting the video source itself or requiring user attention.

Slow links are distinguished from fast links in a relative manner. First a set of default link speeds are specified, such as Ethernet Link=10/100/1000 million bits per second (mbps) and Wi-Fi link=1 mbps. The pre-specified default link speeds reduce bandwidth usage for link measurements. For gateway links with Virtual Private Network (VPN) connections, the link speed is measured. Such VPN measurements will include the effects of any dynamic changes in the underlying default link speeds. Video resolution is then automatically adjusted for gateway nodes according to the associated link speeds.

Figure 2:
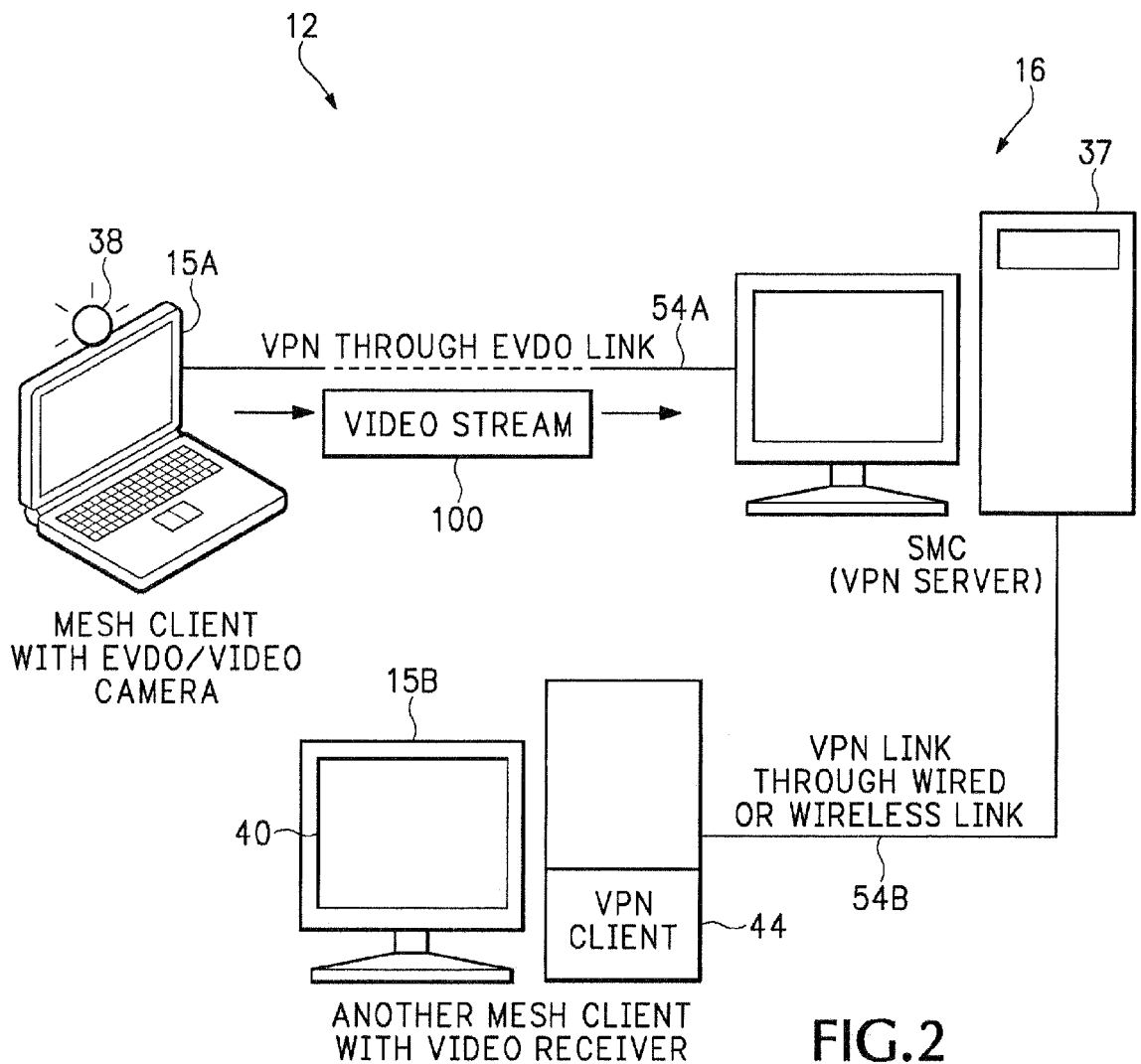
FIG. 2 is a diagram showing one example of the network in FIG. 1 in more detail.

Video packets are also intelligently dropped on forwarding nodes (gateway nodes 15) to adapt to slow link speeds. The video quality is dynamically lowered only when links are overloaded, since graceful degradation in video is better than no video. Consideration is also given to networks where it is rare to forward video through a gateway node to a node in the home network. A video receiver behind a low data rate link will also not prevent other viewers from viewing high quality video from the same source, unless this video receiver is the forwarding node for other viewers Example Network FIG. 2 shows how the transmission rate control scheme is used for a cellular data gateway link. In this typical setup, a video stream 100 is uploading through an Evolutionary Data Only (EvDO) upstream link 54A. The video stream 100 may be generated via a video camera 38 hosted on a laptop computer node 15A. The laptop 15A connects to a System Management Center (SMC) 16 via link 54A using a Virtual Private Network (VPN) connection where a VPN client on laptop 15A connects to a VPN server 37 running on the SMC 16.

A video viewer 40 is running on a desktop computer gateway node 15B and displays the video stream 100 transmitted from laptop computer 15A. A VPN client 44 on desktop computer 15B connects to the SMC 16 through a wired or wireless connection 54B.

One goal is to more efficiently transmit data, including video stream 100, through narrow band links (compared to Ethernet or WLAN), such as the EVDO upstream link 54A. If the bandwidth on upstream link 54A is low, for example, 50 kbps, the transmission rate for the video stream 100 is reduced. The video viewer 40 may see slower motion but clear video. When the bandwidth of the upstream link 54A increases, for example, to 500 kbps, the transmission rate is increased. The video viewer 40 will in turn display clearer video with more motion.

Link Measurements

Figure 3:
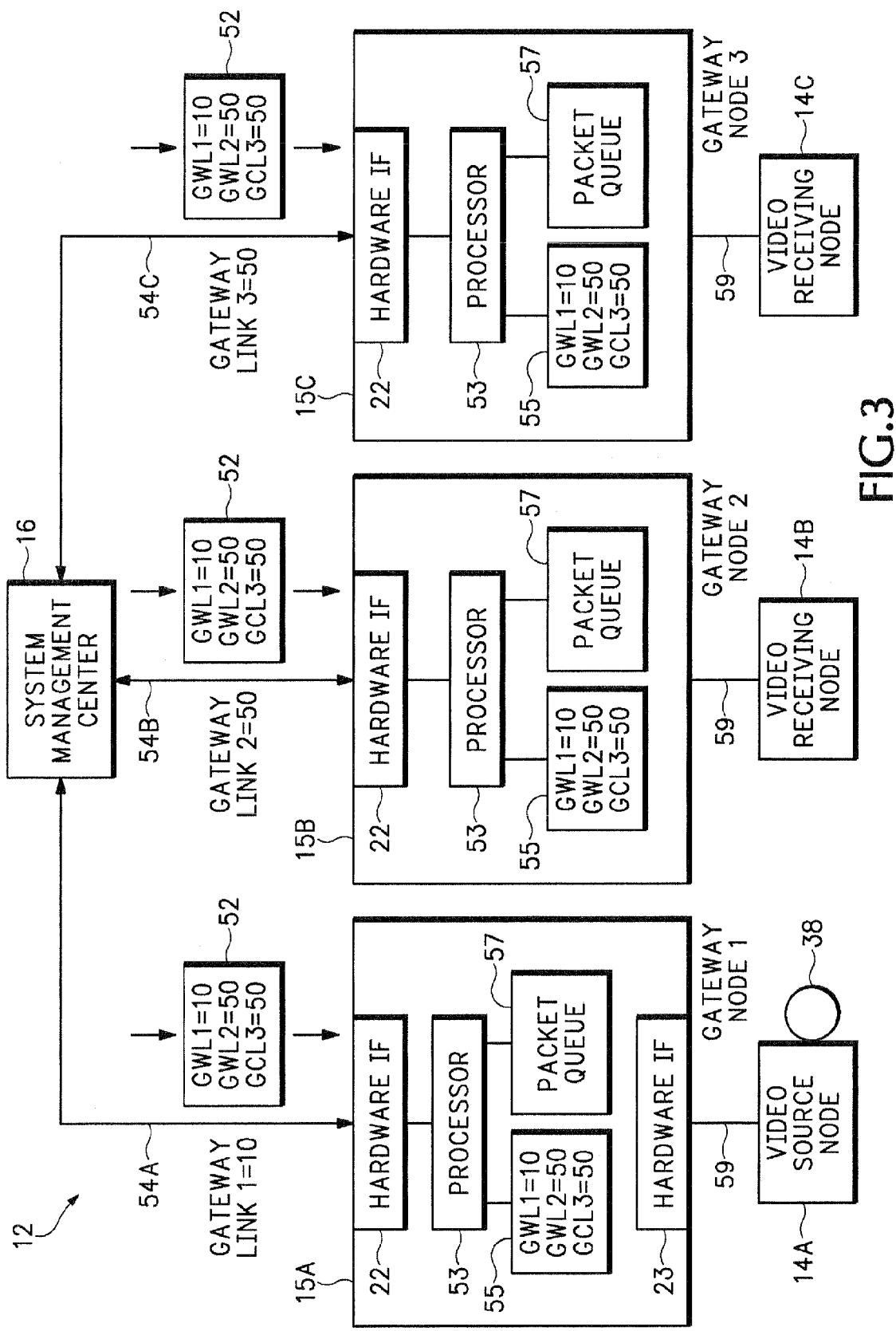
FIG. 3 shows how a dynamic transmission rate control scheme is used in the network shown in FIG. 1.

FIG. 3 shows some of the different nodes in FIGS. 1 and 2 in more detail. As described above, the nodes 14 or 15 can be any device that is capable of transmitting and/or receiving wireless or wired packet communications. In this example, the gateway nodes 15A-15C are shown communicating through the system management center 16 over gateway links 54A-54C. Different combinations of the nodes 14 and 15 can communicate with each other either directly through wired or wireless links or indirectly through gateway links 54 established though the gateway nodes 15 and system management center 16.

Figure 4:
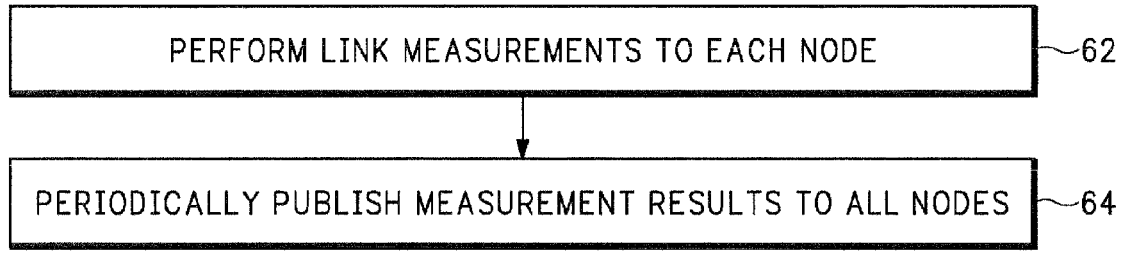
FIG. 4 is a flow diagram showing how link measurements are used in the dynamic rate control scheme of FIG. 3.

Referring to FIGS. 3 and 4, speeds for gateway links 54A-54C between the gateway nodes 15A-15C, respectively, and management center 16 may dynamically change over time. Accordingly, the management center 16, such as a VPN server, periodically measures the quality of each gateway link 54A-54C in operation 62.

The measurement can be done in a variety of ways. A very effective and efficient way is to send ping request packets and measure the amount of time it takes to receive the ping reply.

In operation 64, the management center 16, then periodically sends reports 52 that contain the link measurement results to every gateway node 15.

Figure 5:
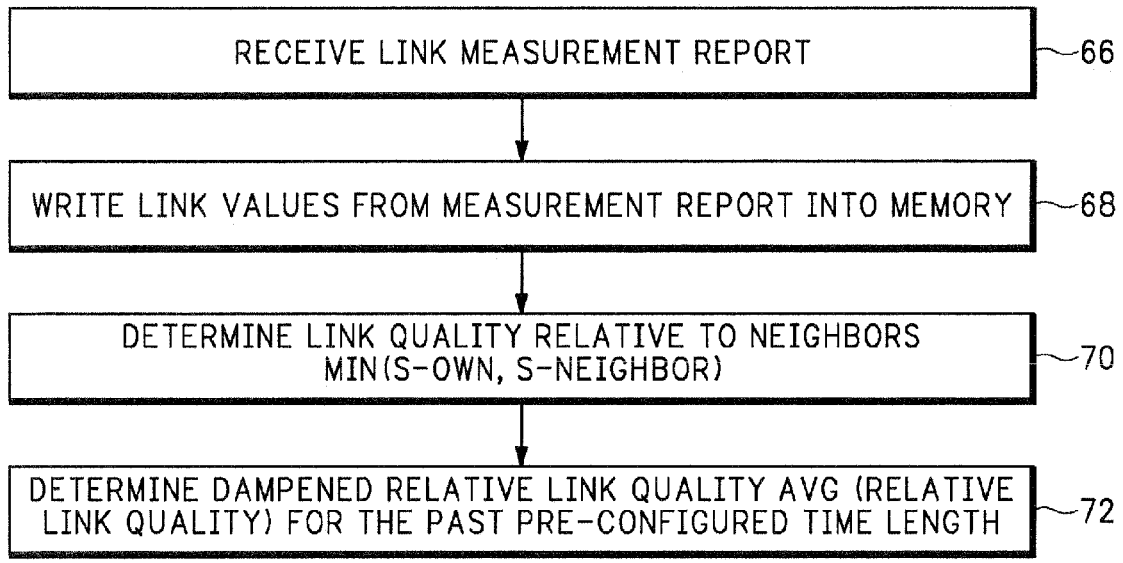
FIG. 5 is a flow diagram showing how transmission rates are determined according to the link measurements in FIG. 4.

Referring to FIGS. 3 and 5, for simplicity, links directly between nodes 14 and 15 within the network 12 are assigned default quality values associated with certain relatively static interfaces. For example, an Ethernet interface or Wi-Fi interface 23 in gateway node 15A may provide a relatively static link 59 to node 14A and is accordingly assigned a predefined link value.

Although the description of video packet processing and filtering algorithms are described in the context of measurements made on gateway VPN links 54 as an example, the algorithms can be utilized for transmissions between nodes 14 or between nodes 14 and gateway nodes 15. The measurements can include measurements similar to those for gateway links 54 or additional measurements as well.

Each gateway node 15A-15C receives the link measurement report 52 in operation 66 containing the quality values for the gateway links 54A-54C. The contents of the report 52 are written in local storage 55 in operation 68 for example with a corresponding software VPN daemon operated by a processor 53.

The gateway nodes 15A-15C then use a comparison MIN (S-own, S-neighbor) in operation 70 to determine a relative link quality. The term S-own is the measured link speed between the gateway node 15 and the management server 16. The S-neighbor term is the measured link speed between the neighbor nodes and the management server 16.

In one example, gateway link 54A may have a measured link speed 500 kbps, gateway link 54B may have a measured link speed 100 kbps, and gateway link 54C may have a measured link speed 100 kbps. Gateway node 15A may take the average of the neighbor gateway link speed to determine that S-neighbor=(100+100)/2=100 kbps. Accordingly, the relative link quality MIN(S-own=500, S-neighbor=100)=100 kbps.

The above calculated relative link quality is further processed to generate a dampened relative link quality in operation 72. This dampening process can be done in a variety of ways. The goal is to keep the system stable and avoid responding to short-term events such as the bandwidth degradation on a Wi-Fi link, for example, caused by a passing vehicle. One effective way would be to take the average of the relative link quality in the past 5 minutes or other configurable time length.

The Gateway Link Values (GLVs) are used by a routing protocol to calculate link metrics and distributed as part of routing updates. Link metrics are characterized as up or down based on their assigned values. When a neighbor node is first identified, the associated link 54 may initially be given an infinite metric. After the link 54 is fully stable, the real metric is assigned based on pre-assigned values. When a link 54 is dropped, the metric may be set back to infinity (the higher the metric, the less attractive the link becomes).

If a link 54 stays infinite for a pre-selected time, the link may be removed. Table 1 is an example of how link metrics can be defined after corresponding link speed (link quality value) measurements. This is just one example, and any other metric association could be used.

As mentioned above, the gateway node 15 supplying a video stream to other nodes supplies the video at different rates according to the link metrics associated with the path to the receiving node. In this example, any direct Wi-Fi, Ethernet, or Fast VPN link form the vide source to the video receiver receives the video at the fastest video rate. Any nodes connected to the video source through gateway link 1 may receive video at a slower video rate and any nodes connected to the video source through gateway link 2 may receive video at even slower video rate. Any nodes connected to the video source through gateway link having a metric of 100 may not be sent the video stream.

TABLE 1

Example metrics based on link speeds.

| Link speed | Link name | Metric |
|---|---|---|
| 1 mbps and up | Wi-Fi/Eth/Fast VPN | 10 |

TABLE 1-continued

Example metrics based on link speeds.

| Link speed | Link name | Metric |
|---|---|---|
| 300 kbps-1 mbps | Gateway link 1 | 40 |
| 30 kbps-300 kbps | Gateway link 2 | 50 |
| 0-30 kbps | Infinite/Worst | 100 |

The link quality metric is then used to determine a target transmission rate for transmitting a media stream to one or more receiving nodes. For example, node 14A may contain a camera 38 that generates a video stream 100 for sending to receiving node 14C. The link quality metric for gateway link 54A is 10; however, the link quality metric for gateway link 54C is only 50. Accordingly, the gateway node 15A will transmit the media steam 100 at a packet rate commensurate with the lowest link speed metric of 50 in the gateway link path 54A and 54C between video generation node 14A and video receiving node 14C. For example, the media stream 100 may be transmitted by gateway node 15A at a rate of somewhere between 30 kbps-300 kbps even though gateway link 54A has a bandwidth of more than 1 mbps.

The link metrics are also used to determine which gateway links 54A-C to use for routing packets. For example, the gateway node 15 may be able to send a media stream to a receiving node over two different links. The gateway node 15 would accordingly send the media stream over the link with the lowest metric.

Rate Control Scheme for QoS (RCS)

The rate control scheme described below is also implemented by the processor 53 in any of the gateway nodes 15.

```
Q=send queue; R=targeted rate;
W=time window length;        //default 1 second
OSL = over send length;      //keep the hardware busy by over-sending
                             //this is the time length determining how many bytes
                             //to over-send. default 3 milliseconds.
MOS = R*OSL;                 //Maxim bytes to over send. This is constant.
AOS =MOS;                    //Allowed over send bytes for each round
S =0;                        //bytes held by hardware
Time_last = Time( );
While (true)
{
LOOPSTART:
LSL = Time( ) – Time_last;   //Last Sleep Length
Time_last = Time( );
S=Max(S–R*LSL, 0);           //bytes still held by hardware after last sleep
AOS=MOS –S;                  //Allowed Over Send for this round
B=AOS + R*W;                 //Budget for this round
If(B<=0)                     //Send nothing this round. This indicates bad
parameters.
    { Sleep( –B/R); Goto LOOPSTART;}
If (Q empty)
    {Sleep(W, wait on Q); Goto LOOPSTART;}
//Now the normal case, we try to send up to B bytes
Bytes=0
While ( p=Dequeue(Q))
{
    Bytes += Size(P);
Send(P);
    If (B- Bytes <=0)
        {Sleep(W); S=Bytes+S; Goto LOOPSTART;}
}
//B-Bytes >0; we sent all the packets but still have unused budget
Sleep(W, wait on Q); S=Bytes+S; Goto LOOPSTART;
}
```

The term Q refers to a 'send' queue in the node. R refers to a targeted transmission rate based on the gateway link measurements described above. W refers to a time window for waiting for different node conditions. In one example, the time window may be 1 second. However, other values could be used. The time window defines an amount of time for sending and not sending packets, sleeping, and other packet processing actions and evaluations.

The term OSL refers to an 'over send length' that is used to ensure that the node interface hardware 22 is always kept busy. The interface hardware 22 can be any Ethernet, Wi-Fi, VPN, or other wireless or wired interface used for transmitting packets over a wireless or wired communication link. The term MOS refers to 'maximum number of bytes to over send' and is the product of the OSL value and the target transmission rate R.

The term AOS refers to the allowed number of over send bytes to send for each round. The term S tracks the number of bytes still held in hardware interface waiting to be sent. For example, if the hardware interface 22 was given 1000 bytes to send, after one second, there would be S=1000-R bytes still remaining to be sent.

The processor 53 in the gateway node shown in FIG. 3 goes into a loop operation LOOPSTART. The term LSL refers to the difference between a current time Time( ) and a last operation time Time_last indicating how long the node slept since a last operation time.

The term $S=\text{Max}(S-R*LSL, 0)$ indicates the number of bytes still held by the hardware interface 22 after a last sleep operation. The term $AOS=MOS-S$ adjusts the number of allowed over send bytes for a current round by the number of bytes S still held in hardware interface.

The budget B for a current round is $B=AOS+(R*W)$ and refers to the total number of bytes the node can give to the hardware interface 22 to transmit. If the budget is $B<=0$, then there may have been too many packets over sent or the hardware interface 22 is still holding too many bytes to receive more bytes. In this case, the processor 53 goes into a sleep mode for a period $(-B/R)$ to allow the interface hardware to send the budgeted number of packets for the current time window.

Otherwise, when the budget B is greater than zero, the processor 53 tries to send up to B bytes to the interface hardware 22. If the packet queue 57 shown in FIG. 3 is empty (Q empty), the operation Sleep(W, wait on Q); Goto LOOP-START puts the processor 53 into a sleep mode for the duration of the time window W. If in the mean time any packets arrive in the packet queue Q, the processor wakes up and starts another analysis loop.

Normally the processor 53 tries to send up to B bytes from the packet queue 57 to the hardware interface 22. The processor takes p packets from the packet queue p=Dequeue(Q), sends the dequeued packets to the hardware interface 22 Send(P), and keeps track of the number of sent bytes Bytes+=Size(P).

The processor determines if the total number of bytes sent from the packet queue 52 to the interface hardware 22 has reached the calculated budget $(B-\text{Bytes}<=0)$. When the budget B is reached, the processor 53 goes into the sleep mode Sleep(W) for the remainder of the time window W. The total number of bytes sent to the hardware interface 22 is increased by the number of sent bytes plus any previously held bytes $S=\text{Bytes}+S$. The processor 53 then starts another loop LOOP-START.

If all of the bytes in the packet queue 57 are sent to the hardware interface 22 and the calculated budget B has still not been reached $B-\text{Bytes}>0$, the processor 53 goes into the sleep mode Sleep(W, wait on Q). This causes the processor 53 to sleep for the time period window W unless more packets are received in queue Q. When new packets are received during the time window W, the packets are sent to the hardware interface 22 until the calculated budget B is reached. The total number of bytes held by the hardware interface 22 is then increased by the number of bytes sent from the packet queue 57 plus any previously held bytes $S=\text{Bytes}+S$.

Video Intelligent Packet Filtering (VIPF)

An intelligent packet dropping scheme takes into account several factors. When a video frame is dropped, all of the packets associated with that frame should also be dropped. Lower priority frames should also be dropped before high priority frames.

In one embodiment, packets are checked to identify video packets. The type of frame associated with the video packets is also identified. For video from external sources that do not provide appropriate packet formatting and information, additional processing may be needed before allowing the packets into the network. Appropriate policies can then be enforced when accepting new requests for video streams. For example, viewing may be restricted to a lower number of active videos for low speed gateway links.

Figure 6:
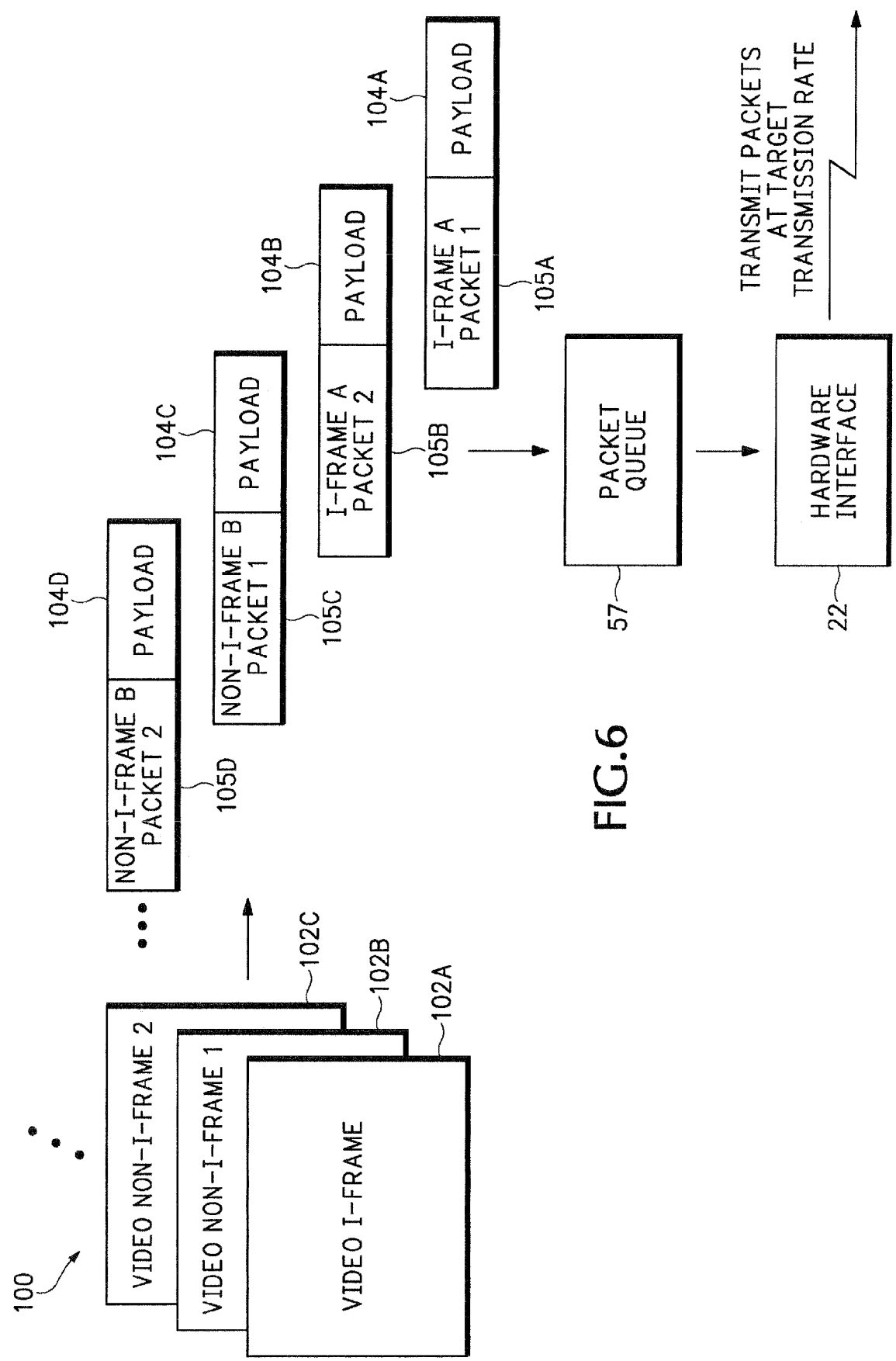
FIGS. 6 and 7 are diagrams showing how packets for video frames are selectively dropped during overflow conditions.

To explain in more detail, FIG. 6 shows a video stream 100 consisting of video frames 102. Some frames 102A are I-frames that can construct entire video images by themselves and are used as reference frames for other non-I-frames 102B. Non-I-frames 102B may contain the differences between the reference frame 102A and a current captured video frame. Note that each frame 102 can comprise one or more packets 104.

The video packets 104 may have associated frame sequence and sub-sequence numbers. For example, the first packet 104A for the video stream 100 may include an identifier 105A identifying the packet as the first packet for I-frame A. The second packet 104B for the video stream 100 may include an identifier 105B identifying the packet as the second packet for I-frame A. Another packet 104C may include an identifier 105C identifying the packet as the first packet for non-I-frame B. The next packet 104D may include an identifier 105D identifying the packet as the second packet for non-I-frame B, etc.

The reference values shown in FIG. 6 are simply for illustrative purposes and any reference scheme can be used to identify the type of I-frame or non-I frame associated, frame number, and frame order for the associated packets 104.

All of the packets 104 for the video stream 100 are received in the packet queue 57 in the associated gateway node 15 shown in FIG. 3 and sent to the hardware interface 22 according to the Rate Control Scheme for QoS (RCS) described above.

Figure 7:
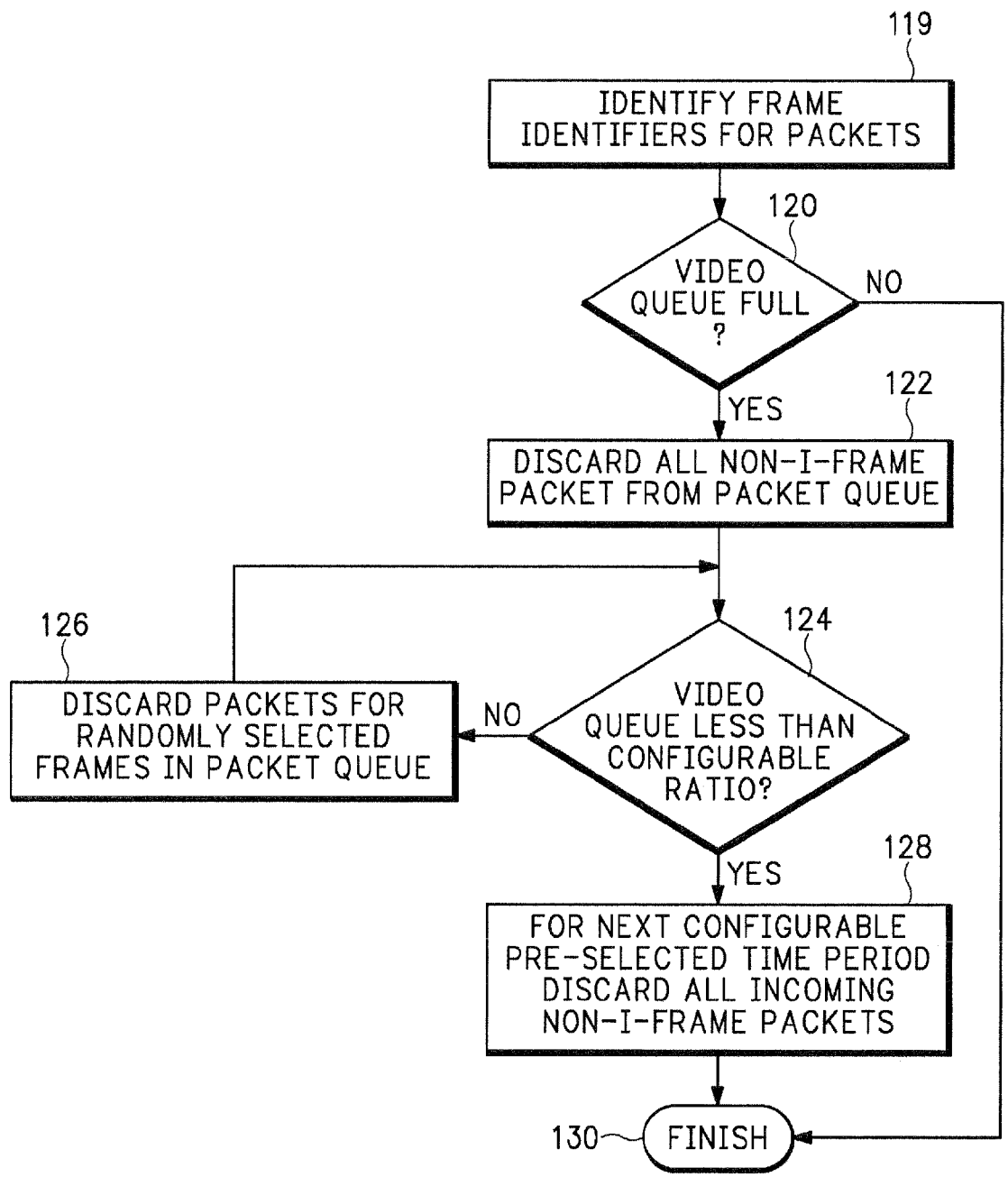

Referring to FIGS. 6 and 7, the frames associated with video packets 104 in the packet queue 57 are identified in operation 119. Operation 120 determines when the packet queue 57 is full. When a full packet queue condition is detected, all non-I-frames packets in the packet queue 57 are discarded in operation 122.

After discarding all of the non-I-frame packets, the processor 53 in FIG. 3 determines if the packet queue 57 is above or below some configurable ratio in operation 124. For example, the packet queue 57 may still be more than half full after removing all non-I-frame packets.

When the packet queue 57 is more than the configurable ratio, frames 102 still remaining in the packet queue 57 are randomly selected and all associated packets discarded in operation 126. This operation is repeated until the packet queue 57 drops down below the predetermined configurable ratio.

A timer is set in operation 128 so that for a next configurable pre-selected time period (for example, 60 seconds) all incoming non-I-frames are discarded prior to being stored in packet queue 57. This prevents the processor 53 from having to store the incoming non-I-frame packets in the packet queue 57 and then possibly discarding the same packets from the packet queue 57.

The operations in FIG. 6 stop transmitting non-I-frame packets as soon the processor 53 determines that a link is not fast enough to operate at the targeted transmission rate R. In other words, if the video packets are backing up in the packet queue 57, it is assumed that the link is not currently fast enough to handle existing video traffic.

In this overload condition, higher priority is given to the packets for the latest received frames 102. For example, packets are first dropped for frame(s) already contained in the packet queue 57 prior to throwing away incoming video packets. Thrashing is avoided by ensuring a minimum amount of space in the video queue, for example, at least half of the video queue, is cleared out whenever an overload condition is identified.

Intelligent packet dropping as described in FIG. 7 works with multiple viewers with significantly different link speeds. The advantage may be relatively higher for lower speed links than for higher speed links. Intelligent packet dropping is described in the context of gateway links 54 (FIG. 3) having lower speeds than internal links in a network. However, intelligent packet dropping can also be used within networks also having slow link speeds.

Thus, an innovative transmission rate control scheme uses measured link metrics for quality of service management to handle video packets over low bandwidth links. An intelligent packet dropping mechanism optimizes the quality of video through an appropriate mix of arrival packet age. The above mechanisms can be applied over links with time varying characteristics. For example, the rate control and packet dropping mechanisms can be used in a network with cellular gateway links or WLAN links.

The transmission rate control scheme supports multiple wide area network carriers/devices/technologies. Topology and link changes are responded to in real-time. Focus is placed on traffic generated within a defined network entity and operation in environments with a large number of gateway nodes may include connecting to external networks.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro-controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A network device, comprising:
   one or more processors configured to transmit a media stream to one or more different neighboring nodes over different associated links, the one or more processors first detecting different operating speeds of the different links and then determining different rates for transmitting the media stream to the different neighbor nodes according to the different detected link operating speeds; and
   a packet queue that receives media packets, the one or more processors:
      sending the media packets from the packet queue to a hardware interface according to the transmission rates determined for transmitting the media stream by calculating a budgeted amount of data for sending from the packet queue to the hardware interface for a predetermined time window;
      moving into an idle mode for the predetermined time window when the packet queue is empty; and
      sending packets from the packet queue to the hardware interface during the time window when the packet queue contains packets and until the budgeted amount of data has been exceeded; and
      moving into the idle mode for the time window when the budgeted amount of data sent from the packet queue to the hardware interface has been exceeded.

2. The network device according to claim 1 wherein the one or more processors:
   transmit the media stream at predetermined default transmission rates over Wi-Fi or Ethernet links to local nodes within a same home network, but measure the operating speeds for gateway links used for transmitting the media stream to remote nodes through gateway nodes; and
   dynamically vary the rate that the media stream is transmitted to the remote nodes according to the slowest measured gateway links to the remote nodes.

3. The network device according to claim 1 wherein the one or more processors:
   receive link measurement reports that identify quality values for gateway links to the neighbor nodes;
   determine metric values for the quality values;
   use the worst case metric values for the gateway links to determine transmission rates to the neighbor nodes.

4. The network device according to claim 1 wherein the one or more processors perform measurements for different links to different neighbor nodes and periodically publish the link measurements to all of the neighbor nodes.

5. The network device according to claim 1 wherein the one or more processors:
   detect the amount of data currently in the hardware interface;
   calculate an over send value identifying an amount of data sent to the hardware interface during the time window above the determined transmission rate; adjust the over send value according to the hardware interface;
   adjust the budgeted amount of data to send from the packet queue to the hardware interface for the next time window according to the adjusted over send value and a target transmission rate.

6. The network device according to claim 1 wherein the one or more processors:
   receive a video stream in a packet queue that contains packets for both I-frames and non-I-frames; and
   discards non-I-frame packets when the packet queue reaches a threshold value.

7. The network device according to claim 6 wherein the one or more processors:
   discard packets for randomly selected frames when the packet queue is still above a preconfigured ratio after discarding the non-I-frame packets; and discard all non-I-frame packets prior to be stored in the packet queue for a predetermined time period whenever the packet queue reaches the threshold value.

8. A method for transferring packets over a network, comprising:
receiving packets for a video stream in a packet queue at a network device;
the network device first detecting different operating speeds of the different links and then determining different rates for transmitting the video stream to different neighbor nodes according to the different detected link operating speeds;
identifying the packets associated with the same frames;
identifying the packets associated with I-frames or non-I-frames;
identifying when the packet queue is filled beyond a given level;
discarding packets associated with the same non-I-frames before discarding the packets associated with the same I-frames when the packet queue reaches the given level; and
transmitting packets from the packet queue to a network interface in accordance with the detected link operating speeds.

9. The method according to claim 8 including discarding packets for all non-I-frames when the packet queue fills beyond the given level.

10. The method according to claim 9 including:
identifying the amount of space freed in the packet queue after discarding the non-I-frame packets; and
discarding packets associated with the same randomly selected I-frames when the amount of freed space is still above a configurable ratio.

11. The method according to claim 8 including selectively discarding only incoming non-I-frame packets prior to storing the incoming packets in the packet queue for a predetermined period of time whenever the packet queue reaches the given level.

12. The method according to claim 8 including:
transmitting the media stream at predetermined default transmission rates to receiving nodes;
measuring the operating speeds to for the links connecting to other associated receiving nodes and through gateway link servers; and
targeting the transmission rates to the other associated receiving nodes according to the slowest measured operating speeds of the associated links.

13. The method according 8 including:
calculating a budgeted amount of data for sending from the packet queue to the hardware interface for a predetermined time period;
moving into an idle mode for the predetermined time period when the packet queue is empty;
sending packets from the packet queue to the hardware interface during the time period while the packet queue contains packets and until the budgeted amount of data has been exceeded; and moving into the idle mode for the time period when the budgeted amount of data sent from the packet queue to the hardware interface has been exceeded.

14. The method according to claim 13 including:
calculating an allowed over send value identifying an amount of data allowed to be sent to the hardware interface above the targeted transmission rate; and
calculating the budgeted amount of data to send from the packet queue to the hardware interface for the next time period according to the allowed over send value and the targeted transmission rate.

15. The method according to claim 8 including:
calculating a first gateway link speed for a directly connected gateway link;
calculating one or more neighbor gateway link speeds for neighboring gateway links in communication with one or more receiving nodes;
calculating the average of the one or more neighbor gateway link speeds; and
using the slower or the first gateway link speed and the averaged neighbor gateway link speeds for transmitting the video stream to the one or more receiving nodes.

16. A system for transmitting video over a network, comprising:
one or more gateway nodes that forward video stream packets to one or more receiving nodes over one or more gateway links, the gateway nodes to:
identify quality values associated with the one or more gateway links by first detecting different operating speeds of the different links and then determining different rates for transmitting the media stream to the different neighbor nodes according to the different detected link operating speeds;
adjust a rate for transmitting the video stream packets to adapt with the lowest identified quality values for the gateway links communicating with the one or more receiving nodes by receiving packets for a video stream in a packet queue, identifying the packets associated with the same frames, identifying the packets as associated with I-frames or non-I-frames, identifying when the packet queue is filled beyond a given level, and discarding packets associated with the same non-I-frames before discarding the packets associated with the same I-frames when the packet queue reaches the given level.

17. The system according to claim 16 wherein the gateway nodes are further configured to:
discard packets for all non-I-frames when the packet queue fills beyond the given level;
identify the amount of space freed in the packet queue after discarding the non-I-frame packets; and
discard packets associated with the same randomly selected I-frames when the amount of freed space is still above a configurable ratio.

* * * * *